March 17, 1964 T. S. KULKA 3,125,216

COMBINED REEL HOUSING AND TAPE RETAINING MEANS

Filed June 21, 1962

INVENTOR

THOMAS S. KULKA

BY Almon S. Nelson

ATTORNEY

United States Patent Office 3,125,216
Patented Mar. 17, 1964

3,125,216

COMBINED REEL HOUSING AND TAPE RETAINING MEANS

Thomas S. Kulka, 200 Film Bldg., 2108 Payne Ave., Cleveland 14, Ohio

Filed June 21, 1962, Ser. No. 204,288
14 Claims. (Cl. 206—52)

This invention relates to the utilization and storage of tapes commonly employed in the magnetic recording of sound or for film used in motion pictures and more particularly to devices for housing the reels upon which such tape is commonly wound and for simultaneously preventing unwinding of the tape from such reels.

This application is a continuation in part of my co-pending application Serial No. 767,866, filed October 17, 1958 which has now matured into Patent No. 3,078,987, dated February 26, 1963, which in turn is a continuation in part of application Serial No. 494,771, filed March 17, 1955 and now Patent No. 2,867,318 dated January 6, 1959.

The use of tape coated with a magnetic substance for recording sound has increased to a remarkable extent over the past few years and in order to prevent damage to the tape which is commonly stored on reels, it is imperative that some means be provided to house such reels and at the same time, prevent inadvertent unwinding of the tape therefrom. This means should be relatively inexpensive and should be capable of application to the reel with a minimum of effort and at the same time, provide an effective means for holding the tape against unwinding and without damage to such tape or the reel upon which the same is wound. It is further desirable that means be provided for housing the reel in order to protect the same and prevent an undesirable accumulation of dust or other foreign substance thereon and obviously, such housing means should occupy a minimum of space.

Heretofore it has been common practice to prevent the unwinding of tape from a reel by merely placing an elastic band or the like about such tape on the reel and storing the reel, either in individual boxes or containers or storing a plurality of reels in a single container. It has also been proposed to utilize various types of clips or spring means which attach to the reel and in various ways, engage the tape thereon to prevent inadvertent unwinding. Unfortunately, the use of many of these prior art devices for preventing inadvertent unwinding of the tape requires a considerable degree of manual dexterity in order to hold the reel, prevent the tape from unwinding and apply the device to the reel in such a manner as to properly engage the tape and at the same time, prevent damage thereto by scratching or other damage caused by too great a pressure on the tape. Furthermore, many of these prior art devices were completely useless for preventing the unwinding of tape from a reel when such tape only partially filled the reel leaving a relatively wide space between the outer circumference of the tape and the outer circumference of the flanges of the reel. Furthermore, few, if any, of these prior art devices provided any means for simultaneously housing or protecting the reels of tape and it was, therefore, necessary to apply the clip or other securing means to the reel and thereafter insert the reel in whatever container was provided therefor. It appears obvious that a combined housing and tape retaining means in which it is only necessary to insert the reel in the housing and at the same time, engage the tape retaining means with the tape on such reel would be highly desirable and represent a very material step forward in the art.

It is accordingly an object of this invention to provide a combined housing and tape retaining means for tape holding reels which may be economically manufactured from readily available materials and in which the reel may be inserted therein in proper position for preventing unwinding of the tape by a simple manual operation.

A further object of the invention is the provision of a combined housing and tape retaining means for tape holding reels in which the housing may be constructed from cardboard or other suitable materials and which may provide a complete housing for the reel and in which the tape retaining means combined therewith may consist of an elastic band of rubber or other suitable material positioned in the housing in such a manner as to automatically engage the tape on the reel when the reel is inserted therein.

A still further object of the invention is the provision of a combined housing and tape retaining means for tape holding reels in which the tape retaining means may be conveniently renewed in the event of breakage or damage thereto.

Another object of the invention is the provision of a combined housing and tape retaining means for tape holding reels in which the tape retaining means is fully operative to prevent unwinding of the tape, regardless of the length of such tape present on the reel.

A further object of the invention is the provision of a combined housing and tape retaining means for tape holding reels in which the tape retaining means operates to retain the reel in the housing and at the same time, prevent inadvertent unwinding of the tape thereon.

A still further object of the invention is the provision of a combined housing and tape retaining means for tape holding reels in which the tape retaining means may take the form of an elastic band provided with an enlarged tape engaging member having a thickness or diameter greater than the thickness or diameter of the band for engaging the tape on the reel and for preventing entry of the band between the tape and a flange of the reel.

Another object of the invention is the provision of a combined housing and tape retaining means for tape holding reels in which the housing is in the form of a circular box open at the top and in which the retaining means comprises an elastic band extending across the box through slits in the sidewall of the box and around one side of the box.

A further object of the invention is the provision of a combined housing and tape retaining means for tape holding reels in which the housing comprises a circular box open at the top and in which the retaining means comprises an elastic band extending across the box and through slits in the sidewall thereof and in which the frictional engagement between the opposite ends of the band and the slits comprises the sole means for retaining the band in position.

A still further object of the invention is the provision of a combined housing and tape retaining means for tape holding reels in which the housing comprises a circular box open at the top and in which the retaining means comprises an elastic band extending across the box and with the opposite ends of the band secured to the sidewall of the box by staples or other suitable fastening means.

A further object of the invention is the provision of a combined housing and tape retaining means for tape holding reels in which the housing comprises a circular box open at the top and in which the retaining means comprises a band extending across the box and secured to the sidewall, the band being composed of a coil spring.

Further objects and advantages of the invention will be apparent from the following description taken in conjunction with the accompanying drawing wherein:

FIG. 1 is a view in perspective showing a circular housing for receiving a reel of tape and in which the tape retaining means comprises an endless elastic band extending diametrically across the housing and around one side thereof, there being a tape engaging enlarged member associated with the band and having a thickness or diameter greater than the thickness of the band and intended to be received between the flanges of a reel of tape and engage the tape thereon;

Figure 1:
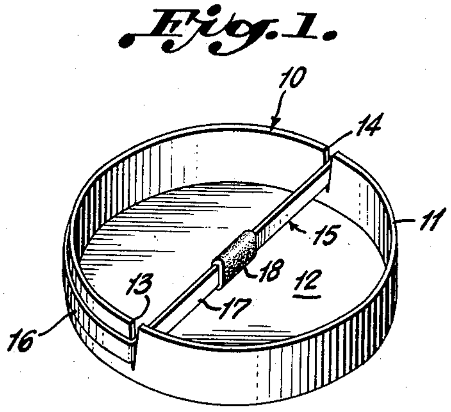

With continued reference to the drawing and particularly FIG. 1, there is shown a combined reel housing and tape retaining means constructed in accordance with this invention and which may well comprise a circular box 10 formed by a sidewall 11 and a bottom wall 12 and the box 10 may be constructed of cardboard, plastic or any other suitable material. The box 10 is, of course, of a suitable diameter to receive the desired reel of tape and provided in the sidewall 11 at diametrically opposite points are slits 13 and 14 which may be straight or may be tapered as shown in the drawing.

A tape retaining means in the form of an endless elastic band 15 is provided and this band may be formed of rubber or any other suitable material and as clearly shown in FIG. 1, the band 15 extends through the slits 13 and 14 and a portion 16 of the band extends around a portion of the perimeter of the sidewall 11 of the box 10. The portion 17 of the band extends diametrically across the box 10 before the reel has been placed in the box. Disposed on the band substantially centrally of the box 10 is an enlarged tape engaging member 18 which may be formed of a suitable yieldable or other material and the member 18 is of greater thickness or diameter than the thickness or diameter of the band 15 and the purpose of this member 18 will presently appear.

In utilizing the form of the invention shown in FIG. 1, a reel of tape is inserted in the box 10 with the portion 17 of the band 15 and the tape engaging member 18 received between the flanges of the reel and with the member 18 engaging the tape on the reel. The reel is moved to such a position that the same may be disposed entirely within the box 10 and in this position, the band 15 and tape engaging member 18 thereon will operate to retain the reel in the box 10 and engagement of the member 18 with the peripheral surface of the tape on the reel will serve to prevent inadvertent unwinding thereof. Furthermore, the member 18 by reason of the greater thickness thereof with respect to the band 15 will prevent passage of the band 15 between the edges of the tape and a flange of the reel. In the event of breakage or damage to the elastic band 15, the same may be conveniently removed from the slits 13 and 14 and replaced with a new band thereby providing a simple and convenient repair.

Figure 2:
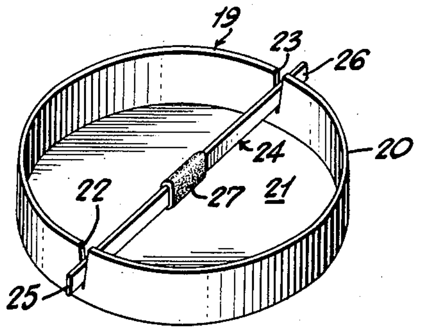
FIG. 2 is a view similar to FIG. 1 and showing a modified form of the invention in which the tape retaining means comprises an elastic band extending diametrically across the housing and secured in place by frictional engagement in slits provided in the sidewall of the housing.

With particular reference to FIG. 2, there is shown a modified form of the invention in which, as before, there is provided a circular box 19 open at the top and formed by a circular sidewall 20 and a bottom wall 21. The box may, of course, be constructed of cardboard, plastic or any other suitable material.

Slits 22 and 23 are provided at diametrically opposite points in the sidewall 20 and the slits 22 and 23 may be straight or tapered as shown in the drawing. A tape engaging member in the form of an elastic band 24 extends across the box 19 and the opposite ends 25 and 26 of the band 24 extend through and are received in the slots 22 and 23 and the frictional engagement of the ends 25 and 26 of the band 24 in the slots 22 and 23 provides the sole means for retaining the band 24 in place in the box 19. The band 24 is provided intermediate the length thereof with an enlarged tape engaging member 27 which is of the same character and performs the same function as the tape engaging member 18 described above in connection with the form of the invention shown in FIG. 1.

The operation of the form of the invention shown in FIG. 2 is identical with that shown in FIG. 1 and, therefore, no further description of the operation appears desirable or necessary and as before, in the event of breakage or damage to the elastic band 24, the same may be conveniently replaced merely by removing the ends 25 and 26 from slits 22 and 23 and inserting the ends of a new band therein.

Figure 3:
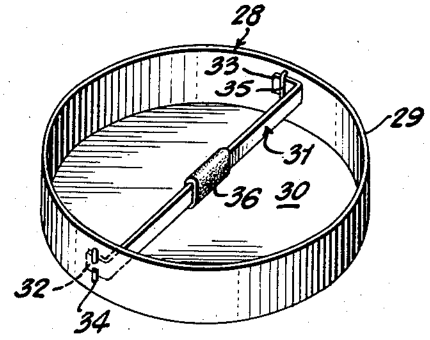
FIG. 3 is a similar view in perspective showing a still further modified form of the invention in which the tape retaining band is secured in place by staples engaging the opposite ends of the band and the sidewall of the housing.

In FIG. 3 there is shown a still further modified form of the invention wherein there is provided a circular box 28 formed by a sidewall 29 and a bottom wall 30. The box 28 may, of course, be constructed of cardboard, plastic or any other suitable material.

Extending across the box 28 is a reel and tape retaining means in the form of an elastic band 31 which may be formed of rubber or any other suitable material and the opposite ends 32 and 33 of the band 31 are secured at diametrically opposite points to the sidewall 29 of the box 28 by staples 34 and 35 or by any other suitable fastening means. Provided on the band 31 intermediate the length thereof is an enlarged tape engaging member 36 which is similar in structure and operation to the tape engaging members described above in connection with the other forms of the invention.

The operation of the form of the invention shown in FIG. 3 is again identical to that described above in connection with the other forms of the invention and no further description of the operation is considered desirable or necessary. The band 31 in the event of breakage or damage thereto may, of course, be conveniently replaced by merely removing the staples 34 and 35 and securing a new band in place.

Figure 4:
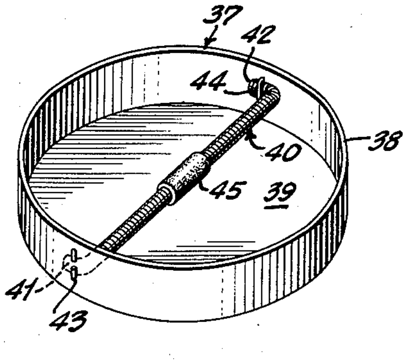
FIG. 4 is a similar view of a still further modified form of the invention in which the tape retaining means is composed of a coil spring; and, FIG. 5 is a perspective view showing a reel mounted in the reel housing and with the tape retaining means engaging the tape on the reel.

With particular reference to FIG. 4, there is shown a still further modified form of the invention in which a circular box 37 is formed by a circular sidewall 38 and a bottom wall 39. As before, the box 37 may be made of cardboard, plastic or any other suitable material. Extending across the box 37 is an elastic band 40 in the form of a coil spring and the opposite ends 41 and 42 are secured to the sidewall 38 by staples 43 and 44 or by any other suitable fastening means. An enlarged tape engaging member 45 is provided on the coil spring 40.

The form of the invention shown in FIG. 4 operates in the same manner as the other forms of the invention described above. As before, in the event of breakage or damage to the spring 40, the same may be replaced merely by removing the staples 43 and 44 and securing a new spring in place.

Figure 5:
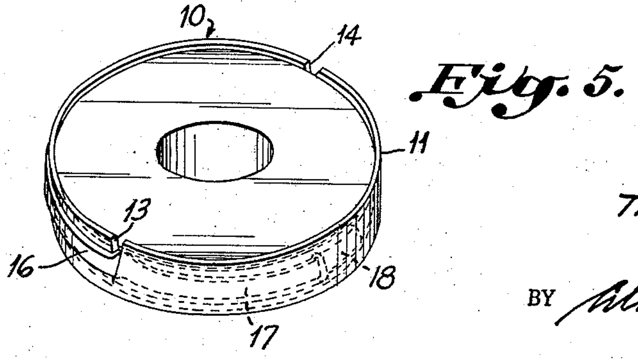

FIG. 5 shows a reel mounted in the box 10 with the band extending approximately half-way around the exterior of the box, the remaining portion of the band engaging the tape on the reel with the thickened portion of the band 18 preventing any possibility of the band's being received between the tape and either flange of the reel.

While in all forms of the invention, the tape engaging and reel retaining band is shown as extending diametrically across the circular box, it is, of course, understood that such band may extend across the box in other locations and furthermore, a coil spring, such as shown in FIG. 4, may be substituted for the rubber bands shown in the other forms of the invention and various equivalent fastening means for securing the band in place may be utilized.

For the sake of clarity, no cover for the box is shown, but it is, of course, to be understood that a removable cover may be utilized to provide a complete housing for a reel of tape or, if desired, a cover may be hingedly mounted on the sidewall of the box.

It will be obvious that by the above described invention there has been provided a relatively simple, yet highly effective combined reel housing and tape retaining means which will operate to effectively retain the reel in the housing and at the same time, prevent inadvertent unwinding of the tape thereon, regardless of the diameter of the tape on the reel and furthermore, means has been provided to prevent entry of the retaining band between the edges of the tape and the flange of the reel. The device of this invention may be very conveniently operated and without any particular manual dexterity merely by inserting the reel of tape in the box which will result in automatically engaging the retaining band between the flanges of the reel and in contact with the tape thereon to retain the reel in position and at the same time, prevent inadvertent unwinding of the tape.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A combined reel housing and tape retaining means comprising a circular sidewall and a bottom wall providing a circular box open at the top, an elastic band extending across a major portion of said box and secured to said sidewall and a tape engaging member on said band, said tape engaging member having a thickness greater than that of said band, whereby a reel of tape may be disposed in said box with said band and member received between the flanges of said reel and said member engaging the tape on said reel to retain said reel in said box and prevent unwinding of said tape.

2. A combined reel housing and tape retaining means comprising a circular sidewall and a bottom wall providing a circular box open at the top and an elastic band extending across a major portion of said box prior to reception of a reel in said box secured to said sidewall, whereby a reel of tape may be disposed in said box with said band received between the flanges of said reel and engaging approximately half of the periphery of the tape on said reel to retain said reel in said box and prevent unwinding of said tape.

3. A combined reel housing and tape retaining means comprising a circular sidewall and a bottom wall providing a circular box open at the top, diametrically opposed slits in said sidewall and an endless elastic band extending around half of said sidewall, through said slits and across said box, that portion of said endless band which extends across said box having a tape engaging member associated therewith with a thickness greater than the thickness of said band.

4. A combined reel housing and tape retaining means comprising a circular sidewall and a bottom wall providing a circular box open at the top, diametrically opposed slits in said sidewall and an endless elastic band extending around half of said sidewall, through said slits and across said box.

5. A combined reel housing and tape retaining means comprising a circular sidewall and a bottom wall providing a circular box open at the top, slits in opposite sides of said sidewall and an endless elastic band extending around a portion of said sidewall, through said slits and across said box.

6. A combined reel housing and tape retaining means comprising a circular sidewall and a bottom wall providing a circular box open at the top, diametrically opposed slits in said sidewall, an elastic band extending across said box with the opposite ends of said band disposed in said slits, the frictional engagement between said band and said slits providing the sole means for securing said band to said sidewall and an enlarged tape engaging member on said band, whereby a reel of tape may be disposed in said box with said band and member received between the flanges of said reel and said member engaging the tape on said reel to retain said reel in said box and prevent unwinding of said tape.

7. A combind reel housing and tape retaining means comprising a circular sidewall and a bottom wall providing a circular box open at the top, slits in opposite sides of said sidewall, an elastic band extending across said box with the opposite ends of said band disposed in said slits, the frictional engagement between said band and said slits providing the sole means for securing said band to said sidewall and a tape engaging member on said band, said tape engaging member having a thickness greater than that of said band, whereby a reel of tape may be disposed in said box with said band and member received between the flanges of said reel and said member engaging the tape on said reel to retain said reel in said box and prevent unwinding of said tape.

8. A combined reel housing and tape retaining means comprising a circular sidewall and a bottom wall providing a circular box open at the top, slits in opposite sides of said sidewall and an elastic band extending across said box with the opposite ends of said band disposed in said slits, the frictional engagement between said band and said slits providing the sole means for securing said band to said wall, whereby a reel of tape may be disposed in said box with said band received between the flanges of said reel and engaging the tape on said reel to retain said reel in said box and prevent unwinding of said tape.

9. A combined reel housing and tape retaining means comprising a circular sidewall and a bottom wall providing a circular box open at the top, an elastic band extending diametrically across said box, staples securing the opposite ends of said band to said sidewall and a tape engaging member on said band, said tape engaging member having a thickness greater than that of said band, whereby a reel of tape may be disposed in said box with said band and member received between the flanges of said reel and said member engaging the tape on said reel to retain said reel in said box and prevent unwinding of said tape.

10. A combined reel housing and tape retaining means as defined in claim 9 in which said elastic band is composed of a coil spring.

11. A combined reel housing and tape retaining means comprising a circular sidewall and a bottom wall providing a circular box open at the top, an elastic band extending across a major portion of said box, staples securing the opposite ends of said band to said sidewall and a tape engaging member on said band, said tape engaging member having a thickness greater than that of said band, whereby a reel of tape may be disposed in said box with said band and member received between the flanges of said reel and said member engaging the tape on said reel to retain said reel in said box and prevent unwinding of said tape.

12. A combined reel housing and tape retaining means as defined in claim 11 in which said elastic band is composed of a coil spring.

13. A combined reel housing and tape retaining means comprising a circular sidewall and a bottom wall providing a circular box open at the top, an elastic band extending across a major portion of said box and staples securing the opposite ends of said band to the interior surface of said sidewall, whereby a reel of tape may be disposed in said box with said band received between the flanges of said reel and engaging the tape on said reel to retain said reel in said box and prevent unwinding of said tape.

14. A combined reel housing and tape retaining means as defined in claim 13 in which said elastic band is composed of a coil spring.

References Cited in the file of this patent

UNITED STATES PATENTS

| | | |
|---|---|---|
| 1,483,592 | Pelstring | Feb. 12, 1924 |
| 1,797,539 | Arthur | Mar. 24, 1931 |
| 2,232,425 | Balton | Feb. 18, 1941 |
| 2,542,640 | Dixon | Feb. 20, 1951 |

FOREIGN PATENTS

| | | |
|---|---|---|
| 386,182 | Great Britain | Jan. 12, 1933 |